United States Patent
Takemoto

(10) Patent No.: US 12,444,078 B2
(45) Date of Patent: Oct. 14, 2025

(54) HEAD-MOUNTED DISPLAY DEVICE, IMAGE PROCESSING DEVICE, CONTROL METHOD OF HEAD-MOUNTED DISPLAY DEVICE, AND NON-TRANSITORY COMPUTER READABLE MEDIUM EACH OF WHICH ESTIMATE AT LEAST ONE OF POSITION AND ORIENTATION OF HEAD-MOUNTED DISPLAY DEVICE

(71) Applicant: CANON KABUSHIKI KAISHA, Tokyo (JP)

(72) Inventor: Kazuki Takemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/999,189

(22) Filed: Dec. 23, 2024

(65) Prior Publication Data
US 2025/0131588 A1    Apr. 24, 2025

Related U.S. Application Data

(63) Continuation of application No. PCT/JP2023/015224, filed on Apr. 14, 2023.

(30) Foreign Application Priority Data

Jun. 30, 2022    (JP) .................. 2022-105685

(51) Int. Cl.
G06T 7/73    (2017.01)
G06T 7/593    (2017.01)

(52) U.S. Cl.
CPC ............. *G06T 7/73* (2017.01); *G06T 7/593* (2017.01); *G06T 2207/10012* (2013.01)

(58) Field of Classification Search
CPC . G06T 7/73; G06T 7/593; G06T 2207/10012; H04N 5/64; H04N 5/66;
(Continued)

(56) References Cited

U.S. PATENT DOCUMENTS 9,805,691 B2    10/2017  Umehara
10,306,217 B2    5/2019  Sato
(Continued)

FOREIGN PATENT DOCUMENTS

JP    2016-213663 A    12/2016
JP    2018-005778 A    1/2018
(Continued)

OTHER PUBLICATIONS

Jun. 20, 2023 International Search Report in International Patent Appln. No. PCT/JP2023/015224.

*Primary Examiner* — Nasim N Nirjhar
(74) *Attorney, Agent, or Firm* — Venable LLP

(57) ABSTRACT

A head-mounted display device includes a first camera provided on a front surface, a projector provided on the front surface and configured to project a pattern image onto an imaging range of the first camera, and a second camera provided on a side surface. The head-mounted display device acquires first information on a state of the head-mounted display device by detecting features of a real space from an image captured by the first camera, acquires second information on the state by detecting features of the real space from an image captured by the second camera, and generates an image of a virtual object, based on the first and second information, wherein the second information is acquired by detecting the features of the real space from an image in which the pattern image does not appear.

11 Claims, 3 Drawing Sheets

(58) Field of Classification Search
CPC .. H04N 13/239; H04N 13/344; H04N 13/366;
H04N 23/60
See application file for complete search history.

(56) References Cited

U.S. PATENT DOCUMENTS

| | | |
|---|---|---|
| 10,839,536 B2 | 11/2020 | Grossinger |
| 12,211,151 B1 * | 1/2025 | Chiou .................. G06T 19/003 |
| 2015/0103096 A1 | 4/2015 | Gotoda |
| 2016/0309143 A1 | 10/2016 | Fu |
| 2020/0105005 A1 | 4/2020 | Grossinger |
| 2021/0037231 A1 * | 2/2021 | Masuda ............... H04N 13/122 |
| 2021/0096726 A1 * | 4/2021 | Faulkner .................. G06F 3/017 |
| 2021/0294106 A1 * | 9/2021 | Meitav ..................... H04N 9/31 |

FOREIGN PATENT DOCUMENTS

| | | |
|---|---|---|
| JP | 2021-009557 A | 1/2021 |
| JP | 2022-511257 A | 1/2022 |
| KR | 10-2021-0022343 A | 3/2021 |
| WO | 2013/179427 A1 | 12/2013 |
| WO | 2020/072084 A1 | 4/2020 |

* cited by examiner

HEAD-MOUNTED DISPLAY DEVICE, IMAGE PROCESSING DEVICE, CONTROL METHOD OF HEAD-MOUNTED DISPLAY DEVICE, AND NON-TRANSITORY COMPUTER READABLE MEDIUM EACH OF WHICH ESTIMATE AT LEAST ONE OF POSITION AND ORIENTATION OF HEAD-MOUNTED DISPLAY DEVICE

CROSS-REFERENCE TO RELATED APPLICATIONS

This application is a Continuation of International Patent Application No. PCT/JP2023/015224, filed Apr. 14, 2023, which claims the benefit of Japanese Patent Application No. 2022-105685, filed Jun. 30, 2022, all of which are hereby incorporated by reference herein in their entirety.

BACKGROUND OF THE INVENTION

Field of the Invention

The present invention relates to a head-mounted display device, an image processing device, a control method of the head-mounted display device, and a non-transitory computer readable medium.

Background Art

A display device capable of estimating the position and orientation thereof, based on an image captured by a camera (captured image) has been proposed as a head-mounted display device (for example, HMD (head-mounted display)). Technology related to such a head-mounted display device is disclosed, for example, in PTL 1. By using the estimated position and orientation, it becomes possible to display for the user an image appropriately. For example, it becomes possible to synthesize an image of a virtual space or a virtual object in a real space without creating a sense of strangeness.

However, with a conventional head-mounted display device, the position and orientation of the head-mounted display device may not be estimated with high accuracy. For example, when a user wearing a head-mounted display device moves his/her head quickly, feature points in the real space tracked by a camera may go outside the imaging range of the camera, or the motion blur of the feature points may occur in the captured image. As a result, the feature points cannot be tracked, and the position and orientation of the head-mounted display device cannot be estimated with high accuracy.

The present invention provides a technology that can estimate (determine) at least one of the position and orientation of a head-mounted display device with high accuracy.

CITATION LIST

Patent Literature

PTL 1 Japanese Patent Application Publication No. 2021-009557

SUMMARY OF THE INVENTION

The present invention in its first aspect provides a head-mounted display device including a first camera provided on a front surface, a projector provided on the front surface and configured to project a pattern image onto an imaging range of the first camera, a second camera provided on a side surface, and one or more processors and/or circuitry configured to execute a first acquisition processing of acquiring first information on a state including at least one of a position and an orientation of the head-mounted display device by detecting features of a real space from an image captured by the first camera, execute a second acquisition processing of acquiring second information on the state by detecting features of the real space from an image captured by the second camera, and execute a generation processing of generating an image of a virtual object, based on the first information and the second information, wherein in the second acquisition processing, the second information is acquired by detecting the features of the real space from an image in which the pattern image does not appear.

The present invention in its second aspect provides an image processing device usable with a head-mounted display device including a first camera provided on a front surface, a projector provided on the front surface and configured to project a pattern image onto an imaging range of the first camera, and a second camera provided on a side surface, the image processing device including one or more processors and/or circuitry configured to execute a first acquisition processing of acquiring first information on a state including at least one of a position and an orientation of the head-mounted display device by detecting features of a real space from an image captured by the first camera, execute a second acquisition processing of acquiring second information on the state by detecting features of the real space from an image captured by the second camera, and execute a generation processing of generating an image of a virtual object, based on the first information and the second information, wherein in the second acquisition processing, the second information is acquired by detecting the features of the real space from an image in which the pattern image does not appear.

The present invention in its third aspect provides a head-mounted display device including the first camera, the projector, the second camera, and the above-mentioned image processing device.

The present invention in its fourth aspect provides a control method of a head-mounted display device including a first camera provided on a front surface, a projector provided on the front surface and configured to project a pattern image onto an imaging range of the first camera, and a second camera provided on a side surface, the control method including acquiring first information on a state including at least one of a position and an orientation of the head-mounted display device by detecting features of a real space from an image captured by the first camera, acquiring second information on the state by detecting features of the real space from an image captured by the second camera, and generating an image of a virtual object, based on the first information and the second information, wherein the second information is acquired by detecting the features of the real space from an image in which the pattern image does not appear.

The present invention in its fifth aspect provides a non-transitory computer readable medium that stores a program, wherein the program causes a computer to execute a control method of a head-mounted display device including a first camera provided on a front surface, a projector provided on the front surface and configured to project a pattern image onto an imaging range of the first camera, and a second camera provided on a side surface, the control method including acquiring first information on a state including at least one of a position and an orientation of the head-mounted display device by detecting features of a real space from an image captured by the first camera, acquiring second information on the state by detecting features of the real space from an image captured by the second camera, and generating an image of a virtual object, based on the first information and the second information, wherein the second information is acquired by detecting the features of the real space from an image in which the pattern image does not appear.

Further features of the present invention will become apparent from the following description of exemplary embodiments with reference to the attached drawings.

DESCRIPTION OF THE EMBODIMENTS

An embodiment of the present invention will be described. In this embodiment, an example in which the present invention is applied to an HMD (head-mounted display) will be described, but the present invention can also be applied to other head-mounted display devices. For example, a handheld display device that a user holds in his/her hand and wears (places) on his/her head is a type of head-mounted display device, and the present invention is also applicable to the handheld display device. The present invention is also applicable to a head-mounted display device in which a user views an image with both eyes and to a head-mounted display device in which a user views an image with one eye.

The present invention can be applied to both a video see-through type and an optical see-through type. In the case of the video see-through type, a head-mounted display device displays an image of the outside world (real space) by synthesizing graphics (for example, virtual objects) as necessary. In this case, the user cannot see the real space directly, but can see the real space indirectly or see graphics synthesized with the image of the real space by looking at the displayed image. In the case of the optical see-through type, a head-mounted display device has a lens similar to the lens of normal glasses, and projects graphics onto the lens as necessary. In this case, the user can see the real space directly through the lens or see the graphics projected onto the lens. The present invention is also applicable to a type in which an image of a virtual space is displayed without displaying the image of the real space. In other words, the present invention is applicable to various XR (Cross Reality), such as AR (Augmented Reality), MR (Mixed Reality), and VR (Virtual Reality).

The present invention is also applicable to electronic devices other than the head-mounted display device as long as the electronic device can be used together with the head-mounted display device. An image processing device to which the present invention is applied may be provided in the head-mounted display device or in an electronic device separate from the head-mounted display device. For example, the present invention is also applicable to a controller or a personal computer (PC) connected to the HMD by wire or wirelessly.

Figure 1A:
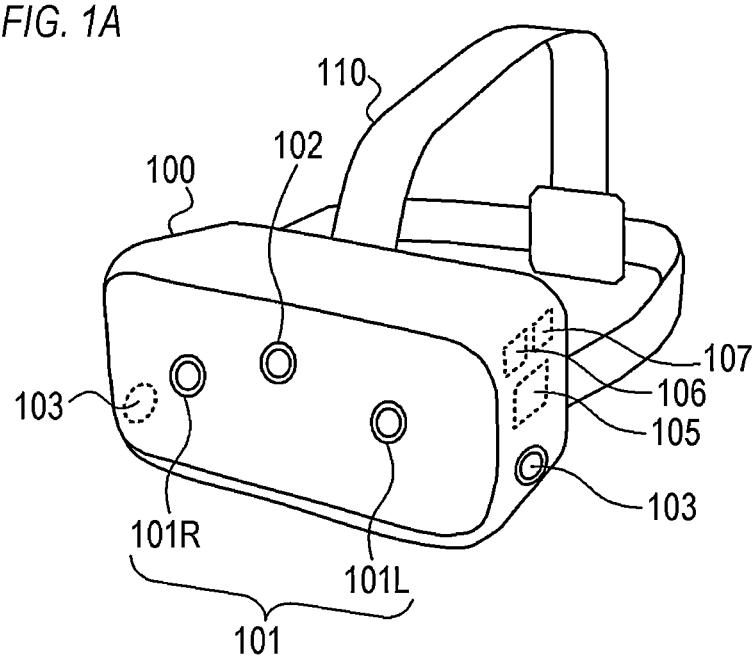
FIGS. 1A and 1B are external views of an HMD according to this embodiment.
Figure 1B:
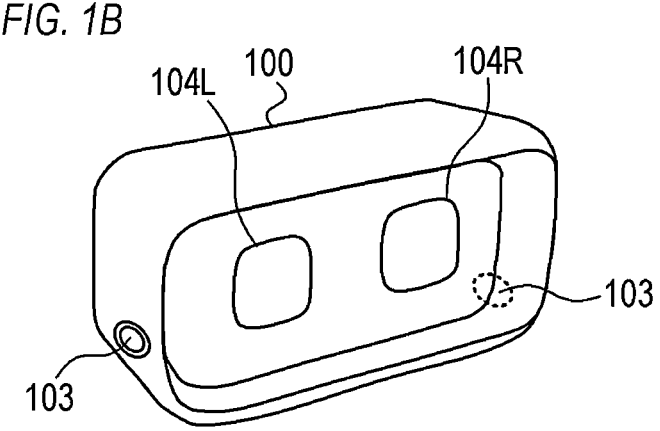

FIGS. 1A and 1B are external views of an HMD 100 according to the embodiment. FIG. 1A is a front perspective view of the HMD 100, and FIG. 1B is a rear perspective view of the HMD 100. As shown in FIG. 1A, the HMD 100 is provided with a headband 110. The user places the HMD 100 in contact with the eyes and fixes it to the head with the headband 110. The HMD 100 has a stereo camera 101, a projection unit 102, a side camera 103, a left display unit 104L, and a right display unit 104R. The HMD 100 has a CPU (Central Processing Unit) 105, a ROM (Read Only Memory) 106, and a RAM (Random Access Memory) 107 therein.

The stereo camera 101 is a camera (imaging device) that images the outside world, and has a left imaging unit 101L and a right imaging unit 101R. For example, the stereo camera 101 is a global shutter-type camera (the left imaging unit 101L and the right imaging unit 101R are, for example, a global shutter-type imaging unit). The images obtained by the stereo camera 101 (each of the left imaging unit 101L and the right imaging unit 101R) are, for example, grayscale images. The projection unit 102 is oriented in the same direction as the stereo camera 101, and projects a pattern image into the imaging range of the stereo camera 101. In this embodiment, the projection unit 102 projects a pattern image of invisible light (for example, a dot pattern of infrared light). The side camera 103 is also a camera that captures the outside world, and is, for example, a global shutter-type camera. The images obtained by the side camera 103 are also, for example, grayscale images. The left display unit 104L is disposed so as to face the left eye of the user wearing the HMD 100, and displays an image (display image, left display image) to be viewed by the left eye of the user. The right display unit 104R is disposed so as to face the right eye of the user wearing the HMD 100, and displays an image (display image, right display image) to be viewed by the right eye of the user.

The CPU 105 is an information processing device (image processing device) that controls the entire HMD 100. The ROM 106 stores various pieces of data (for example, various programs and various parameters). The RAM 107 also stores various pieces of data (including images captured by the stereo camera 101 and images captured by the side camera 103). For example, the CPU 105 loads a program stored in the ROM 106 into the RAM 107 and executes it.

Figure 2:
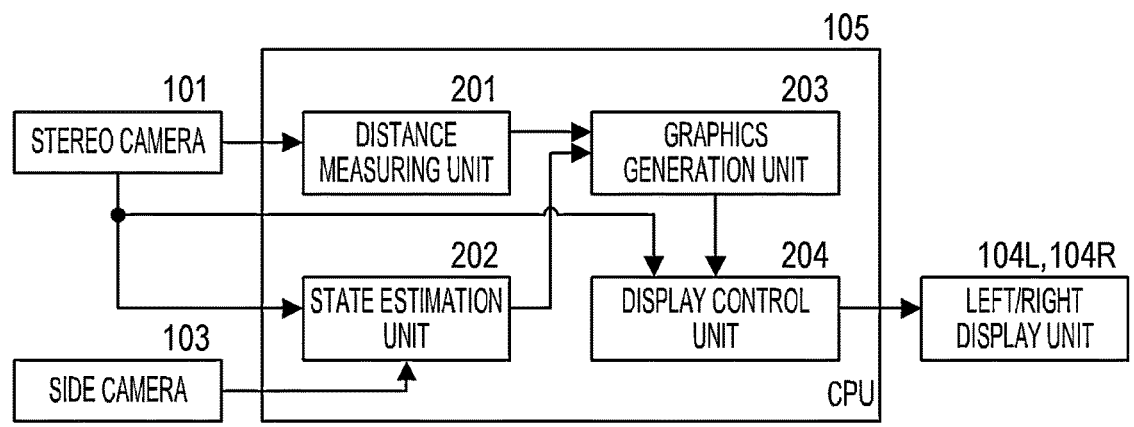
FIG. 2 is a block diagram showing the functional configuration of a CPU according to this embodiment.

FIG. 2 is a block diagram showing the functional configuration of the CPU 105. The CPU 105 has a distance measuring unit 201, a state estimation unit 202, a graphics generation unit 203, and a display control unit 204.

The distance measuring unit 201 acquires two images having a parallax from the stereo camera 101 (an image captured by the left imaging unit 101L and an image captured by the right imaging unit 101R). The distance measuring unit 201 then generates a distance map (distance information, depth map, depth information) from the two acquired images. The image used by the distance measuring unit 201 is an image in which a pattern image projected by the projection unit 102 is captured. The distance map is information indicating the distribution of the distance (depth) from the stereo camera 101 to the object, and is, for example, an image having a depth value as a pixel value. Note that a monocular camera may be used instead of the stereo camera 101. For example, a ToF (Time of Flight) camera may be used. In that case, the image captured by the ToF camera can be used as the distance map. However, from the viewpoint of stability of various processes, the stereo camera 101 is more preferable than the monocular camera.

The state estimation unit 202 estimates the state of the HMD 100 based on the image captured by the stereo camera 101 (image captured by the stereo camera 101) and the image captured by the side camera 103 (image captured by the side camera 103). In this embodiment, the state of the HMD 100 includes at least one of the position and the orientation of the HMD 100.

The graphics generation unit 203 generates graphics. For example, the graphics generation unit 203 generates an image of a virtual object so that the virtual object is placed at a three-dimensional position based on the distance map generated by the distance measuring unit 201 and the state of the HMD 100 estimated by the state estimation unit 202.

The display control unit 204 generates a left display image based on the image captured by the left imaging unit 101L, and displays the left display image on the left display unit 104L. The display control unit 204 synthesizes the graphics (for example, virtual objects) generated by the graphics generation unit 203 as necessary, and generates a left display image in which the graphics are arranged. Similarly, the display control unit 204 generates a right display image based on the image captured by the right imaging unit 101R, and displays the right display image on the right display unit 104R. The display control unit 204 synthesizes the graphics (for example, virtual objects) generated by the graphics generation unit 203 as necessary, and generates a right display image in which the graphics are arranged. It is preferable that the image used by the display control unit 204 is an image in which the pattern image projected by the projection unit 102 does not appear.

Here, a configuration is considered in which the state of the HMD 100 is estimated based only on the images captured by the stereo camera 101. In such a configuration, the state of the HMD 100 may not be estimated with high accuracy. For example, when a user wearing the HMD 100 moves his/her head quickly, the feature points in the real space tracked by the stereo camera 101 may go outside the imaging range of the stereo camera 101, or the motion blur of the feature points may occur in the image captured by the stereo camera 101. As a result, the feature points cannot be tracked, and the state of the HMD 100 cannot be estimated with high accuracy.

Therefore, in this embodiment, the image captured by the side camera 103 is further used. The side camera 103 is disposed so that an image of a range that does not overlap with the projection range of the pattern image is captured. The projection range of the pattern image may be a part of the imaging range of the stereo camera 101, or may be the entire imaging range of the stereo camera 101. In this embodiment, the projection unit 102 projects the pattern image onto the entire imaging range of the stereo camera 101. Therefore, the side camera 103 captures an image of a range that does not overlap with the imaging range of the stereo camera 101.

As a result, the range that can be referred to in estimating the state of the HMD 100 is expanded by the imaging range of the side camera 103, so that the state of the HMD 100 can be estimated with high accuracy. For example, even if the feature point is outside the imaging range of the stereo camera 101, as long as an image of the feature point is captured by the side camera 103, the state of the HMD 100 can be estimated with high accuracy. Furthermore, even if motion blur of the feature point occurs in the image captured by the stereo camera 101, as long as motion blur of the feature point does not occur in the image captured by the side camera 103, the state of the HMD 100 can be estimated with high accuracy.

Note that in this embodiment, the stereo camera 101 and the side camera 103 are both global shutter-type cameras, but the present invention is not limited to this. For example, a rolling shutter-type camera may be used as the stereo camera 101. A rolling shutter-type camera is less expensive than a global shutter-type camera, and is easy to increase the resolution. Therefore, by using a rolling shutter-type camera as the stereo camera 101, the price of the HMD 100 can be reduced and the resolution of the displayed image can be increased. A rolling shutter-type camera may also be used as the side camera 103. However, since the global shutter type is less likely to cause distortion in the captured image than the rolling shutter type, it is preferable to use a global shutter-type camera from the viewpoint of distortion suppression. For example, it is preferable that the side camera 103 can capture an image with less distortion than the image captured by the stereo camera 101, so it is preferable to use a global shutter-type camera as the side camera 103.

The frame rate of the stereo camera 101 and the frame rate of the side camera 103 are not particularly limited, but they are preferably the same (for example, 60 fps, 90 fps, or 120 fps). If the frame rate of the stereo camera 101 is the same as the frame rate of the side camera 103, the difference in timing difference between the images captured by these cameras can be reduced, thereby enabling more suitable processing.

Figure 3:
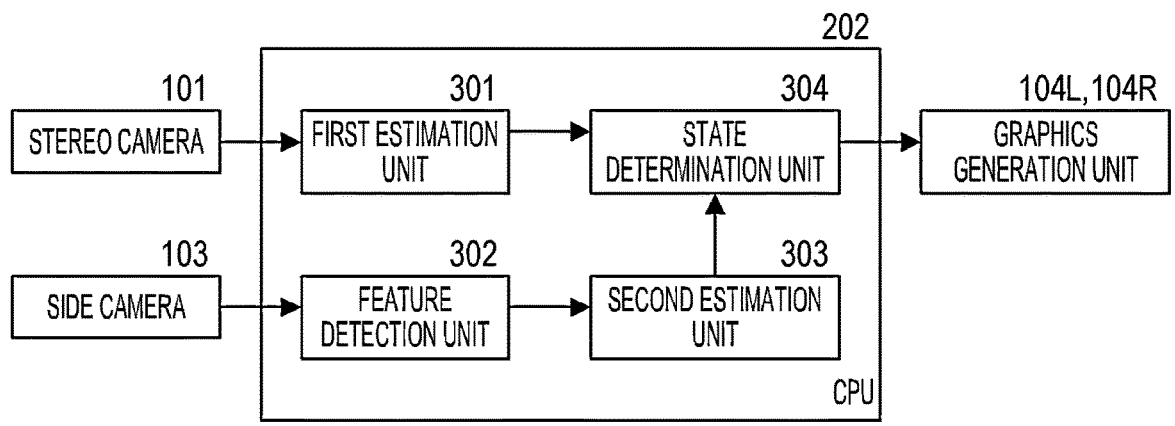
FIG. 3 is a block diagram showing the functional configuration of a state estimation unit according to this embodiment.

FIG. 3 is a block diagram showing the functional configuration of the state estimation unit 202. The state estimation unit 202 has a first estimation unit 301, a feature detection unit 302, a second estimation unit 303, and a state determination unit 304.

The first estimation unit 301 acquires first information on the state of the HMD 100 based on the image captured by the stereo camera 101. In this embodiment, the first estimation unit 301 estimates the state of the HMD 100 based on the image captured by the stereo camera 101, thereby acquiring first information indicating the estimated state. For example, the first estimation unit 301 estimates the state of the HMD 100 by SLAM (Simultaneous Localization and Mapping).

Note that the first information may be information regarding the state of the HMD 100, and may be information indicating, for example, an amount of change from a predetermined state. The first estimation unit 301 may use distance information (the distance map generated by the distance measuring unit 201) corresponding to the image captured by the stereo camera 101 to estimate the state of the HMD 100. For example, the first estimation unit 301 may estimate the state of the HMD 100 by RGB-D SLAM. The first estimation unit 301 may estimate the state of the HMD 100 using only the distance information.

When the pattern image projected by the projection unit 102 appears in the image captured by the stereo camera 101, the features of the pattern image (for example, dots) may be erroneously detected as features of the real space (for example, feature points), and the state of the HMD 100 may not be estimated with high accuracy. For this reason, the projection unit 102 may repeat projecting and not projecting the pattern image. Then, the first estimation unit 301 may estimate the state of the HMD 100 based on the image captured by the stereo camera 101 obtained during the period when the pattern image is not projected.

Note that even during the period when the pattern image is projected, the state of the HMD 100 can be estimated by odometry using the image captured by the side camera 103.

For example, the current state of the HMD 100 can be estimated by adding the change in the state of the HMD 100 corresponding to the change over time of the image captured by the side camera 103 (for example, the motion vector of the feature points) to the previous state (estimated state) of the HMD 100.

The feature detection unit 302 detects features from the image captured by the side camera 103. The features to be detected may be features related to the real space. In this embodiment, the feature detection unit 302 detects feature points from the image captured by the side camera 103. The feature points are, for example, points (part or whole of an object) that exist in the real space. A specific object indicating a feature point may be installed, or a part or whole of an object that already exists may be detected as a feature point. Various known techniques (for example, KLT (Kanade-Lucas-Tomasi) Tracker or goodFeatures To Track) can be used to detect the features.

The second estimation unit 303 acquires second information related to the state of the HMD 100 based on the image captured by the side camera 103. The second information may be information related to the state of the HMD 100, and may or may not be information indicating the state of the HMD 100.

As described above, by further using the image captured by the side camera 103, the state of the HMD 100 can be estimated with high accuracy. However, since the range in which the side camera 103 can be arranged is limited, the side camera 103 may be provided in a position with low rigidity. If the side camera 103 is provided in a position with low rigidity, the relative position of the side camera 103 with respect to the stereo camera 101 may change due to temperature or the passage of time. In a configuration in which the state of the HMD 100 is estimated based on the image captured by the side camera 103, if the relative position of the side camera 103 changes, the accuracy of the state estimation decreases. If the side camera 103 is provided in a member different from the member in which the stereo camera 101 is provided, the relative position of the side camera 103 may also change due to a misalignment between these members.

In this embodiment (FIG. 1), the stereo camera 101 is provided on the front of the HMD 100, and the side camera 103 is provided on the side of the HMD 100. The side of the HMD 100 is the surface that the user grasps when wearing the HMD 100, and is often made of a material with lower rigidity than the front in order to reduce the overall weight of the HMD 100. Even if the material of the front and the material of the side are the same, the rigidity of the end part of the material is generally lower than the rigidity of the central part of the material. Therefore, in this embodiment, the side camera 103 is provided at a position with lower rigidity than the position where the stereo camera 101 is provided. Note that the arrangement of the stereo camera 101 and the side camera 103 is not limited to the above arrangement.

Therefore, in this embodiment, the second estimation unit 303 estimates the change in the state of the HMD 100 for a predetermined time based on the image captured by the side camera 103, and acquires second information indicating the estimated change in the state. For example, the second estimation unit 303 estimates the change in the state of the HMD 100 according to the change over time of the feature detected by the feature detection unit 302 (for example, the motion vector of the feature point). Since it is considered that the change in the relative position of the side camera 103 does not occur (or is small) in a predetermined time (short time), the change in the state of the HMD 100 can be estimated with high accuracy. Furthermore, since the change in the relative position of the side camera 103 can be ignored, even if the relative position of the side camera 103 changes, calibration of the state estimation of the HMD 100 is not necessary, and high convenience can be realized.

Note that, in this embodiment (FIGS. 1A and 1B), the side camera 103 is provided on each of the left side and right side of the HMD 100, but the number of side cameras 103 may be one or three or more. When a plurality of side cameras 103 are provided, for example, the second estimation unit 303 estimates a plurality of changes in state using the images captured by the respective side cameras 103 individually, and determines the average of the plurality of changes in state as the final change in the state.

In addition, as long as the change in the relative position of the side camera 103 can be substantially ignored, the predetermined time is not particularly limited, but it is preferable that the predetermined time is short. Therefore, in this embodiment, the second estimation unit 303 estimates the change in the state of the HMD 100 from the image previously captured by the side camera 103 based on the image captured by the side camera 103.

The state determination unit 304 determines the state of the HMD 100 based on the first information and the second information. Generally, in a configuration in which the state of the HMD 100 is estimated based only on the image captured by the stereo camera 101, the more feature points detected from the image captured by the stereo camera 101, the higher the accuracy of the state estimation. Therefore, in this embodiment, when the number of feature points detected from the image captured by the stereo camera 101 is greater than a threshold, the state determination unit 304 determines the state indicated by the first information (the state estimated by the first estimation unit 301) as the state of the HMD 100. Then, the state determination unit 304 determines the state of the HMD 100 based on the first information and the second information when the number of feature points detected from the image captured by the stereo camera 101 is less than the threshold. In this embodiment, the state determination unit 304 determines the current state of the HMD 100 by adding the change in the state estimated by the second estimation unit 303 (the change in the state indicated by the current second information) to the state determined at the timing the predetermined time before the present. The state determined (by the state determination unit 304) at the timing the predetermined time before the present is, for example, the state indicated by the first information obtained at that timing.

Note that the method of determining the state of the HMD 100 is not limited to the above method. For example, the state determination unit 304 may weight and synthesize the change in the state estimated by the second estimation unit 303 and the change in the state estimated by the first estimation unit 301 during the period from the timing before the predetermined time to the present (the change in the state indicated by the first information during that period). The state determination unit 304 may determine the current state of the HMD 100 by adding the change obtained by the weighted synthesis to the state determined at the timing of the predetermined time before the present. By performing the weighted synthesis, it is possible to suppress a sudden change in the result of the state estimation before and after using the second information.

In the weighted synthesis, the state determination unit 304 may use a weight based on the number of feature points detected from the image captured by the stereo camera 101 and the number of feature points detected from the image captured by the side camera 103. For example, the state determination unit 304 increases the weight of the change in the state estimated by the first estimation unit 301 as the difference value obtained by subtracting the number of feature points of the image captured by the stereo camera 101 from the number of feature points of the image captured by the side camera 103 increases. The state determination unit 304 increases the weight of the change in the state estimated by the second estimation unit 303 as the difference value decreases.

Figure 4:
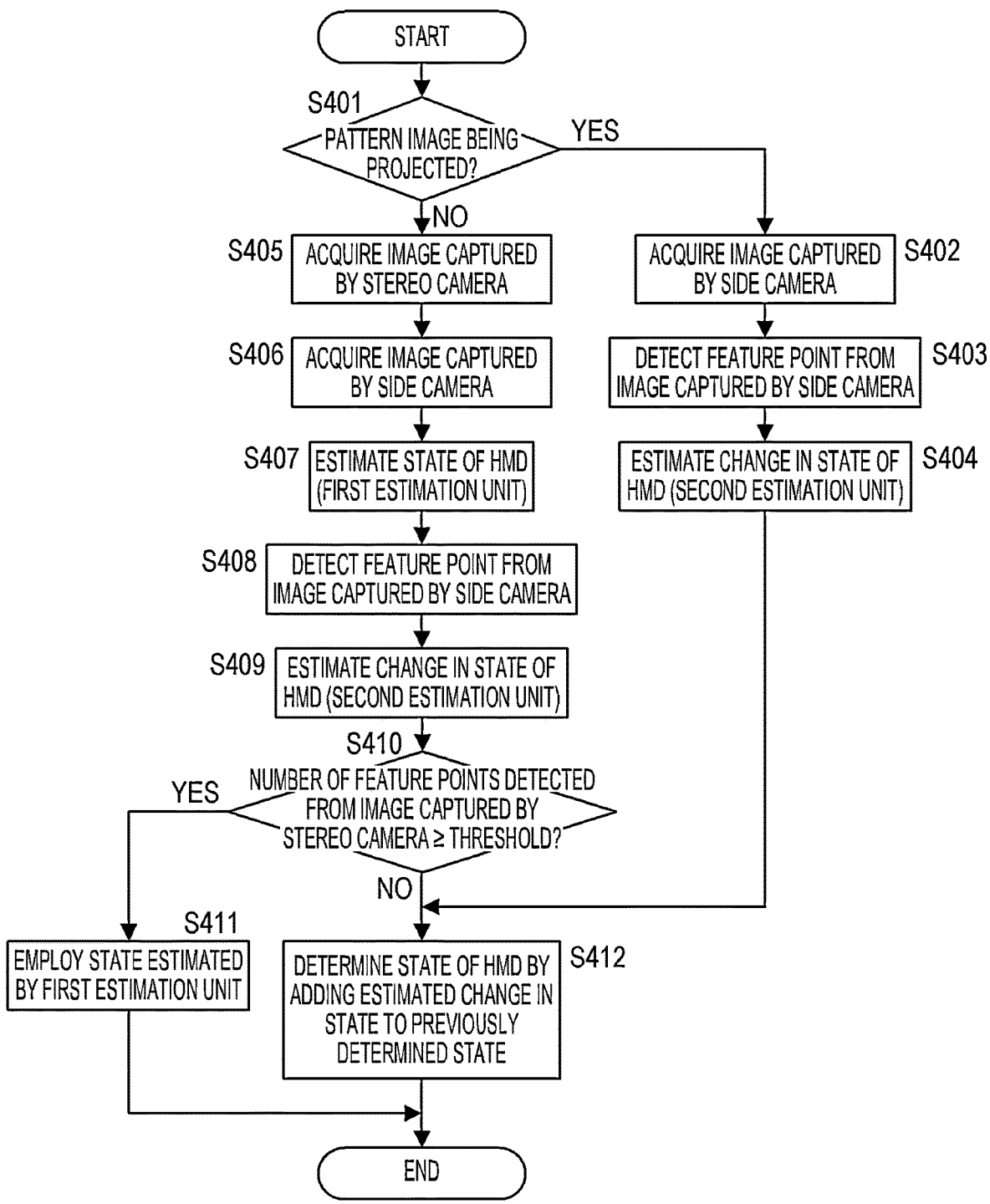
FIG. 4 is a flowchart of a state estimation process according to this embodiment.

FIG. 4 is a flowchart of the state estimation process of the HMD 100. The state estimation process in FIG. 4 is realized by the CPU 105 loading a program stored in the ROM 106 into the RAM 107 and executing it. For example, the state estimation process in FIG. 4 starts when the HMD 100 is started. The CPU 105 repeatedly executes the state estimation process in FIG. 4. In the first state estimation process, for example, the state of the HMD 100 is determined by the processing of step S409.

In step S401, the CPU 105 determines whether a pattern image is projected by the projection unit 102. If the CPU 105 determines that a pattern image is projected, the processing proceeds to step S402, and if the CPU 105 determines that a pattern image is not projected, the processing proceeds to step S405.

In step S402, the CPU 105 (feature detection unit 302) acquires an image captured by the side camera 103. In step S403, the CPU 105 (feature detection unit 302) detects feature points from the captured image (image captured by the side camera 103) acquired in step S402. In step S404, the CPU 105 (second estimation unit 303) estimates a change in the state of the HMD 100 based on the change over time (motion vector) of the feature points detected in step S403. The CPU 105 then advances the processing to step S412.

In step S405, the CPU 105 (first estimation unit 301) acquires an image captured by the stereo camera 101. In step S406, the CPU 105 (feature detection unit 302) acquires an image captured by the side camera 103. In step S407, the CPU 105 (first estimation unit 301) estimates the state of the HMD 100 by SLAM using the captured image (image captured by the stereo camera 101) acquired in step S405. The processing of step S407 includes a process of detecting feature points from the image captured by the stereo camera 101. In step S408, the CPU 105 (feature detection unit 302) detects feature points from the captured image (image captured by the side camera 103) acquired in step S406. In step S409, the CPU 105 (second estimation unit 303) estimates a change in the state of the HMD 100 based on the change over time (motion vector) of the feature points detected in step S408. Thereafter, the CPU 105 advances the processing to step S410.

In step S410, the CPU 105 (state determination unit 304) determines whether the number of feature points detected from the image captured by the stereo camera 101 in step S407 is equal to or greater than a threshold. If the CPU 105 determines that the number of feature points is equal to or greater than the threshold, the processing proceeds to step S411. If the CPU 105 determines that the number of feature points is less than the threshold, the processing proceeds to step S412. Note that if the number of feature points is equal to the threshold, the processing may proceed to step S412.

In step S411, the CPU 105 (state determination unit 304) determines that the state estimated by the first estimation unit 301 in step S407 is the state of the HMD 100.

In step S412, the CPU 105 (state determination unit 304) determines the state of the HMD 100 by adding the change in the state estimated by the second estimation unit 303 in step S404 or step S409 to the state previously determined by the state determination unit 304.

As described above, according to this embodiment, at least one of the position and the orientation of the head-mounted display device can be estimated (determined) with high accuracy. For example, by using the side camera 103 arranged so that an image of a range that does not overlap with the projection range of the pattern image is captured in addition to the stereo camera 101, the range that can be referred to in estimating the state of the HMD 100 can be expanded. As a result, the state of the HMD 100 can be estimated with high accuracy.

Furthermore, according to this embodiment, the state of the HMD 100 is estimated based on the image captured by the stereo camera 101, but the change in the state of the HMD 100 for a predetermined time is estimated based on the image captured by the side camera 103. The state of the HMD 100 is then determined based on these two estimation results. By estimating the change in the state of the HMD 100 for a predetermined time based on the image captured by the side camera 103, it is possible to suppress deterioration in the accuracy of the state estimation of the HMD 100 caused by changes in the relative position of the side camera 103.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The above-mentioned embodiments (including the variation) are only examples, and configurations obtained by deforming or changing the above-mentioned configuration as appropriate within a scope of the gist of the present invention are also included in the present invention. The configurations obtained by combining the above-mentioned configurations as appropriate are also included in the present invention.

According to the present invention, at least one of the position and orientation of a head-mounted display device can be estimated (determined) with high accuracy.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A head-mounted display device comprising:
a first camera provided on a front surface;
a projector provided on the front surface and configured to project a pattern image onto an imaging range of the first camera;
a second camera provided on a side surface; and
one or more processors and/or circuitry configured to
execute a first acquisition processing of acquiring first information on a state including at least one of a position and an orientation of the head-mounted display device by detecting features of a real space from an image captured by the first camera;
execute a second acquisition processing of acquiring second information on the state by detecting features of the real space from an image captured by the second camera; and
execute a generation processing of generating an image of a virtual object, based on the first information and the second information, wherein
in the second acquisition processing, the second information is acquired by detecting the features of the real space from an image in which the pattern image does not appear.

2. The head-mounted display device according to claim 1, wherein
the one or more processors and/or circuitry further executes an acquisition processing of acquiring distance information based on the image captured by the first camera, wherein
in the acquisition processing, the distance information is acquired based on the image in which the pattern image appears.

3. The head-mounted display device according to claim 1, wherein
in a case where it is not possible to acquire the state of high accuracy in the first acquiring processing, in the generation processing, an image of the virtual object is generated based on the second information.

4. The head-mounted display device according to claim 1, wherein
the second camera is provided at a position with lower rigidity than a position at which the first camera is provided.

5. The head-mounted display device according to claim 1, wherein
the second camera is provided on both a left side surface and a right side surface.

6. The head-mounted display device according to claim 1, wherein
a frame rate of capturing by the first camera is same as a frame rate of capturing by the second camera.

7. The head-mounted display device according to claim 1, wherein
each of the first camera and the second camera is a global shutter-type camera.

8. An image processing device usable with a head-mounted display device including a first camera provided on a front surface, a projector provided on the front surface and configured to project a pattern image onto an imaging range of the first camera, and a second camera provided on a side surface, the image processing device comprising:
one or more processors and/or circuitry configured to
execute a first acquisition processing of acquiring first information on a state including at least one of a position and an orientation of the head-mounted display device by detecting features of a real space from an image captured by the first camera;
execute a second acquisition processing of acquiring second information on the state by detecting features of the real space from an image captured by the second camera; and
execute a generation processing of generating an image of a virtual object, based on the first information and the second information, wherein
in the second acquisition processing, the second information is acquired by detecting the features of the real space from an image in which the pattern image does not appear.

9. A head-mounted display device comprising:
the first camera;
the projector;
the second camera; and
the image processing device according to claim 8.

10. A control method of a head-mounted display device including a first camera provided on a front surface, a projector provided on the front surface and configured to project a pattern image onto an imaging range of the first camera, and a second camera provided on a side surface, the control method comprising:
acquiring first information on a state including at least one of a position and an orientation of the head-mounted display device by detecting features of a real space from an image captured by the first camera;
acquiring second information on the state by detecting features of the real space from an image captured by the second camera; and
generating an image of a virtual object, based on the first information and the second information, wherein
the second information is acquired by detecting the features of the real space from an image in which the pattern image does not appear.

11. A non-transitory computer readable medium that stores a program, wherein the program causes a computer to execute a control method of a head-mounted display device including a first camera provided on a front surface, a projector provided on the front surface and configured to project a pattern image onto an imaging range of the first camera, and a second camera provided on a side surface, the control method comprising:
  acquiring first information on a state including at least one of a position and an orientation of the head-mounted display device by detecting features of a real space from an image captured by the first camera;
  acquiring second information on the state by detecting features of the real space from an image captured by the second camera; and
  generating an image of a virtual object, based on the first information and the second information, wherein
  the second information is acquired by detecting the features of the real space from an image in which the pattern image does not appear.

* * * * *